US012265536B2

(12) United States Patent
Chen et al.

(10) Patent No.: US 12,265,536 B2
(45) Date of Patent: Apr. 1, 2025

(54) INTELLIGENT API SERVICE FOR ENTERPRISE DATA IN THE CLOUD

(71) Applicant: Accenture Global Solutions Limited, Dublin (IE)

(72) Inventors: Lianjiang Chen, Norristown, PA (US); Ramesh A. Nair, Skillman, NJ (US); Kristina Knudsen, Pompano Beach, FL (US); Suresh Ganesan, Flower Mound, TX (US)

(73) Assignee: Accenture Global Solutions Limited, Dublin (IE)

( * ) Notice: Subject to any disclaimer, the term of this patent is extended or adjusted under 35 U.S.C. 154(b) by 243 days.

(21) Appl. No.: 17/898,244

(22) Filed: Aug. 29, 2022

(65) Prior Publication Data

US 2024/0069994 A1 Feb. 29, 2024

(51) Int. Cl.

*G06F 21/62* (2013.01)
*G06F 16/23* (2019.01)
*G06F 16/245* (2019.01)
*G06F 16/2453* (2019.01)

(52) U.S. Cl.

CPC ...... *G06F 16/24539* (2019.01); *G06F 16/245* (2019.01); *G06F 21/6227* (2013.01)

(58) Field of Classification Search

None

See application file for complete search history.

(56) References Cited

U.S. PATENT DOCUMENTS 6,904,460 B1 * 6/2005 Raciborski .............. H04L 67/14 709/224
11,704,043 B1 * 7/2023 Throgmorton ...... G06F 11/1469 711/162
2004/0215613 A1 * 10/2004 Venkataraman ...... G06F 40/174
2020/0334242 A1 * 10/2020 Muralidhar ......... G06F 16/2358
2022/0237096 A1 * 7/2022 Bugdayci ............ G06F 11/3438

OTHER PUBLICATIONS

Dipanjan Chakraborty; Toward Distributed Service Discovery in Pervasive Computing Environments; IEEE; vol. 5 No. 1; pp. 97-112 (Year: 2006).*
https://www.mulesoft.com/platform/soa/mule-esb-open-source-esb.
https://www.ibm.com/docs/en/integration-bus/10.0?topic=overview-integration-bus-introduction.
https://www.oracle.com/middleware/technologies/service-bus.html.

* cited by examiner

*Primary Examiner* — Albert M Phillips, III
*Assistant Examiner* — J A M

(57) ABSTRACT

The proposed systems and methods provide a fixed set of intelligent, general APIs to manage access to enterprise data stored in a cloud-based data lake. These systems and methods allow a fixed set of APIs to respond to all queries regarding the stored enterprise data by using a cached reference table that locates the container and document in which the requested data is held. The proposed systems and methods provide a framework for a minimal API service code with the capacity for responding to dynamic queries while maintaining stringent privacy control protections.

12 Claims, 16 Drawing Sheets

1100A

| General Intelligence API | Request Input | | | |
|---|---|---|---|---|
| | Header | | Payload | |
| | Client ID | URL | Required | Optional Additional Attributes |
| Analytic Insights | Contact Center I Mobile Banking I BPM system I Team A | /insights/customers/ | customerNumber | a list of <modelid> 101,102 |
| Customer Demographics Inquiry | Contact Center I Mobile Banking I BPM system I Team A | /insights/customers/demographics | customerNumber | a list of attributes (family_name, address_linel) |
| Customer Alerts | Contact Center I Mobile Banking I BPM system I Team A | /insights/customers/alerts | customerNumber | a list of attributes (family_name, address_linel) |
| Account List | Contact Center I Mobile Banking I BPM system I Team A | /insights/customers/accounts | customerNumber | a list of attributes (account_type, product code) |
| | | | | |
| Client Team | | | | |
| Contact Center | ALL | | | |
| Mobile Banking | pay_nt_enroll | pay_nt_usage | | |
| BPM system | Credit_conf | | | |
| Team A | Proy_credit | Credit_conf | | |

| Container/ Collection Information | Response Output | | | | | | | |
|---|---|---|---|---|---|---|---|---|
| | General Information | | | | Restricted Information | | | |
| | Required Outputs | | Optional Outputs | | | | | |
| Analytic Insights | tracker | N/A | N/A | | pay_nt_enroll_* | pay_nt_usage_* | Credit_conf_* | prov_credit_* |
| customerDemographics | customer Status, customerType | familyName: personData | Address Line1 : postAddress | | N/A | N/A | N/A | N/A |
| customerDemographics | deliveryChannel, Business Function. | alertNumber: Alerts | description: Alerts | | N/A | N/A | N/A | N/A |
| customerDemographics | customer Date, customer Type | accountType: Accounts | productCode: Accounts | | N/A | N/A | N/A | N/A |
| | | | | | | | | |
| | | | | | | | | |
| Restricted Data | | | | | | | | |
| Restricted Attribute ID | 101 | 102 | 103 | 104 | 105 | 106 | 107 | |
| Restricted Attribute Name | atm fee | Sche_transf | fin_distress | pay_nt_enroll | pay_nt_usage | credit_cont | Prov_cred | |

| | | | | |
|---|---|---|---|---|
| Customer Demographics Inquiry | Contact Center I Mobile Banking I BPM system I Team A | /insights/customers/ demographics | customer Number | a list of attributes (family_ name, address_ line1) |

| | | | | | | | |
|---|---|---|---|---|---|---|---|
| customerDe mographics | customer Status, customerT ype | family Name: person Data | Address Line1 : postAddre ss | N/A | N/A | N/A | N/A |

| | | | | |
|---|---|---|---|---|
| Customer Alerts | Contact Center I Mobile Banking I BPM system I Team A | /insights/customers/alerts | customerNumber | a list of attributes (alert_number, description) |

| | | | | | | | |
|---|---|---|---|---|---|---|---|
| customerDemographics | deliveryChannel, businessFunction. | alertNumber: Alerts | description: Alerts | N/A | N/A | N/A | N/A |

| General Intelligence API | Request Input | | | |
|---|---|---|---|---|
| | Header | | Payload | |
| | Client ID | URL | Required | Optional Additional Attributes |
| Analytic Insights | Contact Center I Mobile Banking I BPM system I Team A | /insights/customers/ | customerNumber | a list of <modelid> 101,102 |

| Container/ Collection Information | Response Output | | | | | | |
|---|---|---|---|---|---|---|---|
| | General Information | | | Restricted Information | | | |
| | Required Outputs | | Optional Outputs | | | | |
| Analytic Insights | tracker | N/A | N/A | pay_nt_enroll_* | pay_nt_usage_* | credit_conf_* | prov_conf_* |

| | | |
|---|---|---|
| Client Team | | |
| Contact Center | ALL | |
| Mobile Banking | pay_nt_enroll | pay_nt_usage |
| BPM system | Credit_conf | |
| Team A | Proy_credit | Credit_conf |

| Restricted Data | | | | | | |
|---|---|---|---|---|---|---|
| Restricted Attribute ID | 101 | 102 | 104 | 105 | 106 | 107 |
| Restricted Attribute Name | atm fee | Sche_transf | pay_nt_enroll | pay_nt_usage | credit_conf | prov_conf |

FIG. 14B

INTELLIGENT API SERVICE FOR ENTERPRISE DATA IN THE CLOUD

TECHNICAL FIELD

The present disclosure generally relates to the field of enterprise data transformation. More specifically, the present disclosure relates to consolidation of enterprise data to the cloud and API retrieval of said data.

BACKGROUND

Information related to a business, its customers, its competitors, and the like, is commonly referred to as "enterprise data" and can be used by the business for a variety of purposes. For example, enterprise resource planning (ERP) utilizes enterprise data to implement business functions such as manufacturing, supply chain management, financials, projects, human resources and customer relationship management (CRM). Enterprise data may also be used for product lifecycle management (PLM) to help manufacturers with product-related information. As a further example, enterprise data may be used for supply chain management (SCM) and supplier relationship management (SRM) functions.

Conventional software packages for providing access to enterprise data generally require significant storage and processing resources, and thus, are generally run on desktop computer systems, server computer systems, or the like. The computer system running the conventional software package may generate a query for specific enterprise data and send the query to a system able to access the enterprise data. Once data is received from the system, it may be processed by the computer system running the conventional software package and presented to the user of the computer system. Unfortunately, the current state of enterprise software relies on a multitude of channel partners and client applications that each ask for similar types of data in different ways, leading to burdens on processing power, network bandwidth, available storage space, and other resources.

Advances in computing systems, both local and cloud-based, have led to the capture, storage, and retention of immense quantities of information content in a globally distributed manner. A more effective approach with API (application programming interface)-based services that takes advantage of and adapts to these advances is needed to transform on-prem services to cloud-hosted services to provide scalable and flexible real-time data services in a streamlined and secure manner.

There is a need in the art for a system and method that addresses the shortcomings discussed above.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 11A and FIG. 11B are a cached reference data table.

FIG. 12 is a metadata reference table.

FIG. 13 is a metadata reference table.

FIG. 14A and FIG. 14B are metadata reference tables.

SUMMARY

Figure 1:
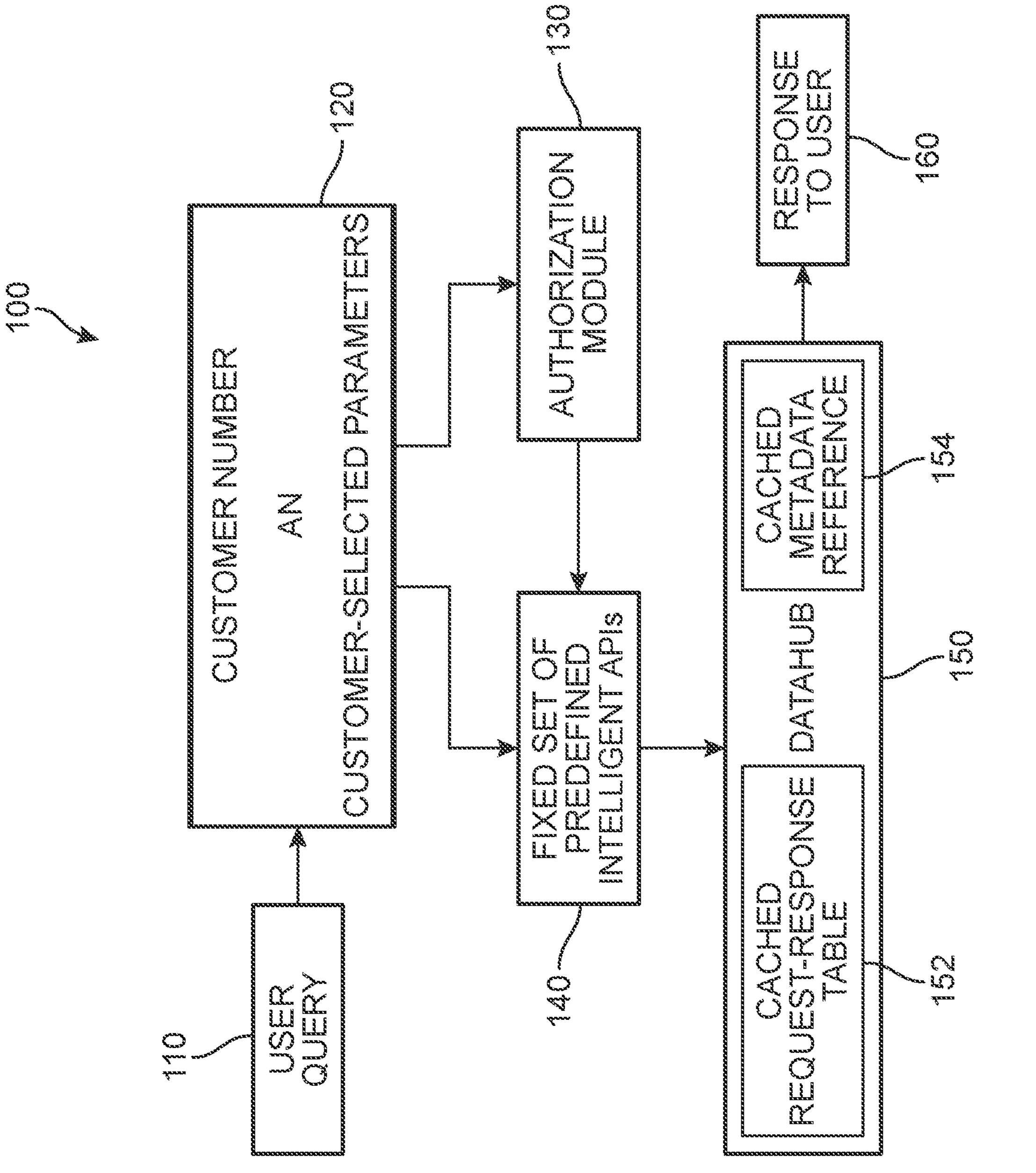
FIG. 1 is a schematic diagram of an overview of a dynamic query-response process using a fixed set of application programming interfaces (APIs), according to an embodiment.

The proposed embodiments describe a highly scalable API-service for enterprise data retrieval. The embodiments provide enterprise services that allow users and/or channels to dynamically query any information that may be available from an API Inquiry Data Hub (ADH) while maintaining a fixed set of intelligent APIs. Each query that is received by the system is handled by the fixed set of APIs by reference to data held in containers in the ADH based on the client's access identifier and selected parameters. The proposed embodiments reduce the computational resources and processing burdens on the enterprise by mapping and transforming source data once, at an early data processing stage, before ingestion into a cloud-based datahub and generating the in-memory cached reference table. In addition, the fixed set of APIs can provide an abstraction layer for front-end applications and serve the entire enterprise in a structured manner for omni-channel usage.

In one aspect, the disclosure provides a method of returning responses to dynamic queries using a fixed set of application programming interfaces (APIs). A first step of the method includes receiving, at a single API, a first query including a first parameter from a first client computing device, and a second step includes identifying, by the API, a first data container of a plurality of data containers stored in a cloud-hosted datahub, the identification based on the first parameter and metadata stored in a cached reference table. A third step includes retrieving, by a first microservice associated with the API and from the datahub, a first data document associated with the first data container, and a fourth step includes selecting, by the first microservice, a first value for an endpoint stored in the first data document based on the first parameter via the cached reference table. In addition, a fifth step includes returning, by the API, the first value for presentation at a first time via the first client computing device in response to the first query.

In another aspect, the disclosure provides a non-transitory computer-readable medium storing software comprising instructions executable by one or more computers which, upon such execution, cause the one or more computers to: (1) receive, at a single API, a first query including a first parameter from a first client computing device; (2) identify, by the API, a first data container of a plurality of data containers stored in a cloud-hosted datahub, the identification based on the first parameter and metadata stored in a cached reference table; (3) retrieve, by a first microservice associated with the API and from the datahub, a first data document associated with the first data container; (4) select, by the first microservice, a first value stored in the first data document based on the first parameter; and (5) return, by the API, the first value for presentation at a first time via the first client computing device in response to the first query.

In another aspect, the disclosure provides a system for returning responses to dynamic queries using a fixed set of application programming interfaces (APIs). The system comprises one or more computers and one or more storage devices storing instructions that are operable, when executed by the one or more computers, to cause the one or more computers to: (1) receive, at a single API, a first query including a first parameter from a first client computing device; (2) identify, by the API, a first data container of a plurality of data containers stored in a cloud-hosted datahub, the identification based on the first parameter and metadata stored in a cached reference table; (3) retrieve, by a first microservice associated with the API and from the datahub, a first data document associated with the first data container; (4) select, by the first microservice, a first value stored in the first data document based on the first parameter; and (5) return, by the API, the first value for presentation at a first time via the first client computing device in response to the first query.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

DESCRIPTION OF EMBODIMENTS

Implementations described herein provide for a system and method delivering scalable and flexible real-time data services by use of a fixed set of general intelligent API microservices. The proposed systems leverage cloud-based technology to significantly reduce reliance on multiple APIs in order to transform and service data and generate insights for clients. Clients can face operational service challenges within their IT environments, such as an excessive number of channel partners and client applications that inefficiently expend resources by requesting similar types of data in different ways, and a proliferation of data sources that must be accessed for retrieval of backend data such as on-prem, SQL, NoSQL, cloud, or other external vendors. Traditional on-prem approaches also must rely on normalized data because their data storage systems are limited. Such conventional approaches to provide enterprise API services for a client's operational data typically rely on source data being mapped and transformed during run-time with web service applications, where many different point-to-point integration services are created to retrieve and join data from different backends for specified business use cases.

In contrast, the proposed embodiments reduce the resources and retrieval processes by mapping and transforming source data once at an early data processing stage before ingestion into a cloud-based datahub. General API services (e.g., fewer than 20 for a specific business domain, such as banking) can retrieve data from the datahub directly and provide abstraction layer for front-end applications. In other words, a limited number of APIs may be provided that can intelligently select what specific data is needed to perform a service. Furthermore, as will be discussed in greater detail below, in some embodiments, this fixed set of generalized intelligent API services are configured to retrieve data from the datahub directly and provide an abstraction layer for front-end applications. In addition, generalized data APIs are provided that can serve the entire enterprise in a structured manner for omni-channel usage. In some embodiments, data in the datahub can be de-normalized canonically in the cloud for optimized performance. This approach significantly reduces the time needed to build and deploy such functionality as well as the cost of implementation because there are fewer APIs to implement.

In some embodiments, a methodology for transforming enterprise data for a cloud framework includes a fixed set of general APIs that provide a "Data as a Service" to the Enterprise. In other words, the proposed embodiments extend the "API as a Product" approach with highly scalable computational resources and expansive storage in the cloud. The fixed set of Intelligent APIs allow all users and/or channels to query any information that may be available from its API Inquiry DataHub (ADH), increasing a velocity of development, and providing aggregation of multiple systems of records within a scalable and flexible cloud environment. The ADH can be stored in a data lake, or a storage repository that can store a large amount of structured, semi-structured, and unstructured data. A data lake is configured to store every type of data in its native format with no fixed limits on account size or file. Thus, an ADH that is based in a data lake offers a large amount of data quantity for increased analytical performance and native integration. The data lake can serve as a large container which has multiple sections of data flowing in and out, such as structured data, unstructured data, machine to machine, logs flowing through in real-time. The breadth and size of the data lake allow the system to perform data ingestion at a much earlier stage than conventional systems, including transformation and mapping, and the data can be denormalized canonically and maintained in a structured, ready-to-use format. In other words, the data can be stored in a more user-friendly format, meaning data that does not need to be converted from one format to another before being returned can be used.

In different embodiments, information can be retrieved from containers by a reference or other identifier (e.g., a customer number) along with any additional parameters that can be specified by the consumer. In response, the relevant information is retrieved from the ADH based on (a) a list of intelligent APIs available from API service catalog with associated common information model (CIM) data attributes and (b) user inputs as additional parameters to refine the required payload for specified use cases. In other words, query results can be returned to a user leveraging the fixed set of predefined API services.

The proposed embodiments are thereby configured to robustly support different backend data sources, including SQL or NoSQL, are highly scalable for supporting high volume calls in the cloud, rely on minimum API service code changes or deployment for new channel partners and applications (only service configuration changes), offer an additional level of data privacy control and protections against unauthorized client application access.

Referring to FIG. 1, an overview of a generalized API procedure 100 for enterprise data in the cloud using an API service provider system ("API service") is presented. In a first stage 110, a user query is received by the system. In a second stage 120, data including the user (customer) access number and selected parameters are extracted from the user query. In a third stage 130, the extracted data is shared with an authorization module as well as sent to a fixed set of predefined intelligent APIs in a fourth stage 140. In different embodiments, the API service is protected by an authorization token, and the client ID (e.g., Mobile Bank, etc.) ensures that data access is restricted.

During the fourth stage 140, client access permission levels that have been identified by the authorization module are also provided to the fixed set of predefined intelligent APIs. Thus, the API service can provide available optional attributes to a client based on permission. From the request, during a fifth stage 150, the API service provider looks up data at the cloud-based datahub, accessing information stored in a cached request-response reference table 152 for backend data source container information as well as cached metadata reference table 154 for the available API metadata (for all of the APIs in the set of fixed APIs). Thus, the cached request-response reference table 152 is one of a plurality of cached request-response reference tables, where each of these cached request-response reference tables includes information specific to one API of the set of fixed APIs, and serves as a directory or dictionary that allows for navigation to the correct data attribute and values requested. It should be appreciated that by storing the information as a cached source in memory in the cloud rather than in the back-end database provides a shortcut or substantial reduction in time to access. In other words, by using a cached reference table, the system performs with much greater speed than other systems that maintain such information in the back-end. In addition, use of a memory-cache allows for the system to adapt in real-time to changes in access permissions for each user, and limits the flow of data in response to the person's corresponding access level (i.e., control which client can access which part of the data). Only the data that is designated as accessible for the current permission will be outputted, regardless of whether the request sought information that was outside of that permission scope.

In a sixth stage 160, the API service returns its response comprising the relevant data based on a client access permission and input. The input can be generated and filtered based on optional attributes selected by the end-user, or include all general information if no additional filtering attribute was submitted within the request.

For purposes of illustration, a non-limiting example of a cached reference data table ("cached reference table") for a banking client as (1100A, 1100B) shown in FIG. 11A and FIG. 11B, respectively.

Figure 2:
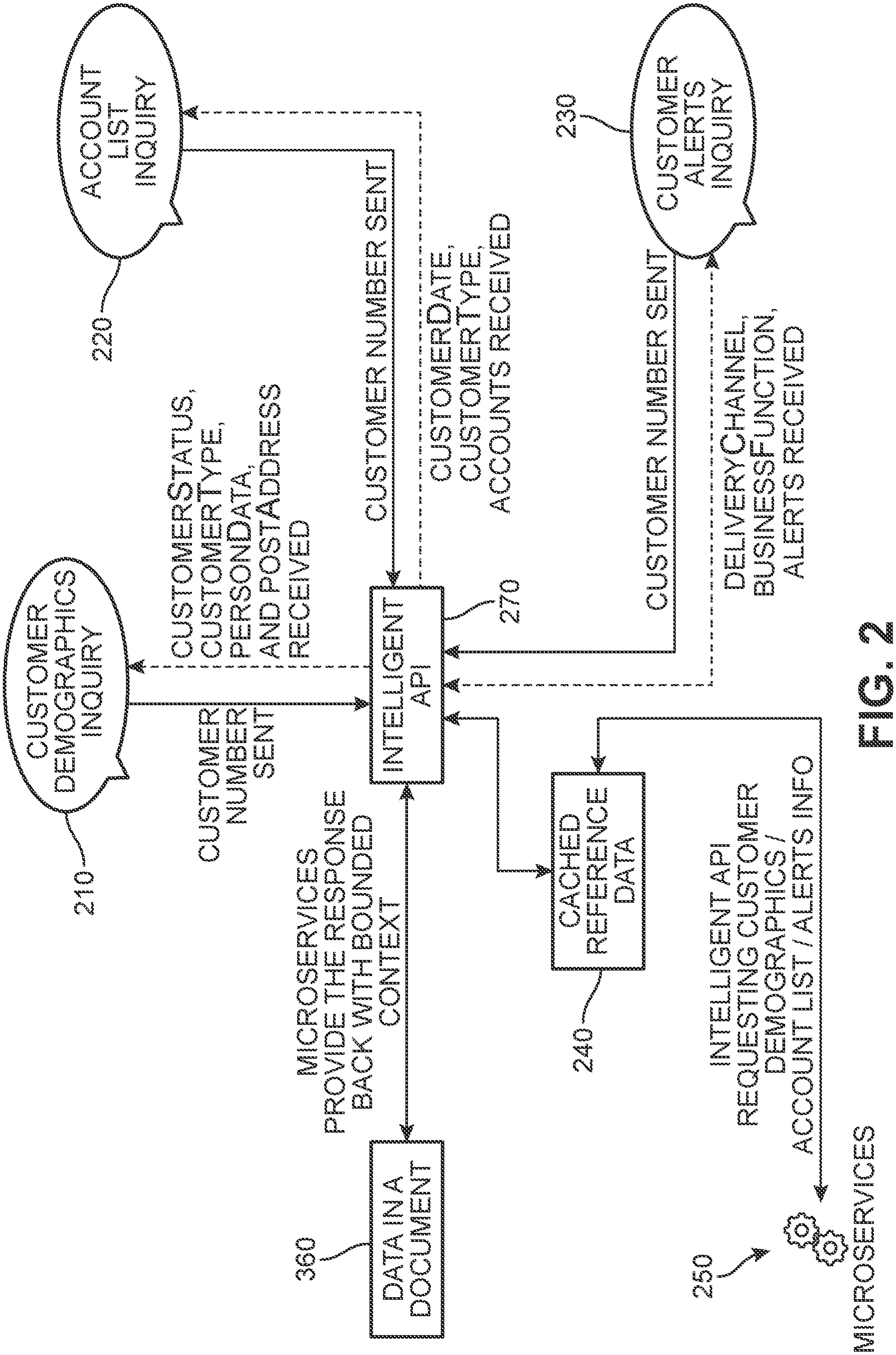
FIGS. 2, 3, and 4 collectively depict a schematic diagram of a set of queries being managed by a fixed API service in the context of a NoSQL DB, according to an embodiment.
Figure 3:
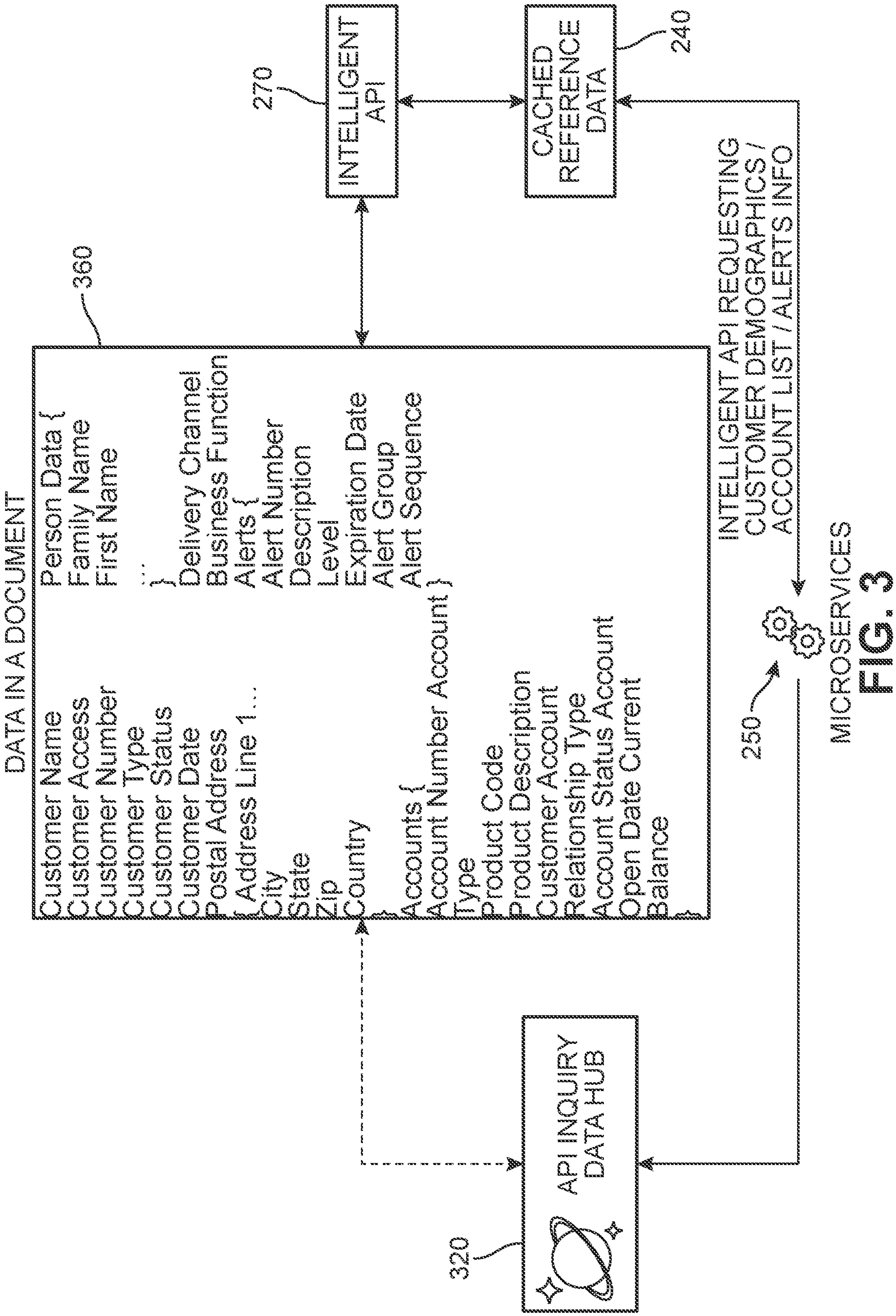
Figure 4:
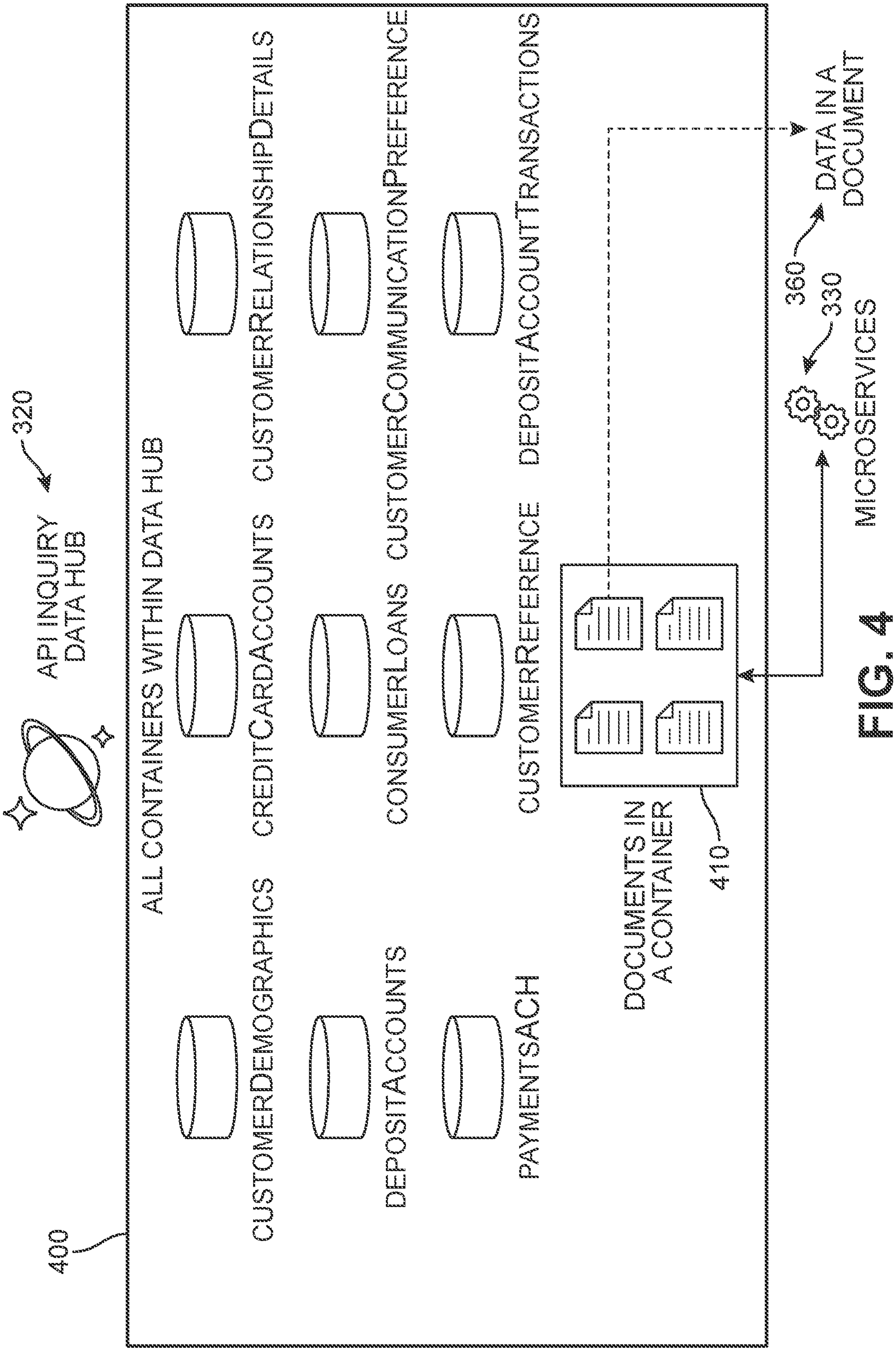

Referring now to FIGS. 2-4, an example of an environment is depicted in which an intelligent API service provider system can be implemented. Although the diagram is shown across three figures for purposes of clarity, it should be understood that they each comprise a portion (sub-environment) of the example environment. In this example, customer service is provided with NoSQL DB, and in some embodiments, the system can be configured such that the required data can be contained in only around twenty data containers of known structure. In FIG. 2, various example queries are illustrated as they are received by an API service 270. In this case, a first query 210 (e.g., a customer demographics inquiry) has been submitted to the API service 270, as well as a second query 220 (e.g., an account list inquiry), and a third query 230 (e.g., a customer alerts inquiry). In each query, a customer number for the client is transmitted to the API service 270, along with specific parameters desired. In response, the API service 270 communicates with cached reference table 240 which generates requests for the data to be retrieved via microservices 250.

In FIG. 3, the process continues as the microservices 250 reaches out to API Inquiry datahub 320 to extract the appropriate data in a document 360 (also referred to herein as a "data document") based on the selected container. Some example containers 400 that may be maintained in the datahub 320 are shown in FIG. 4, such as customerDemographics, creditCardAccounts, customerRelationshipDetails, depositAccounts, consumerLoans, customerCommunicationPreference, paymentsACH, customerReference, and depositAccountTransactions. Each of the containers 400 can include one or more documents 410 that hold structured data related to that particular container. It is from one of these documents that the microservices 250 can extract information as data in a document 360.

For purposes of this example, the data in a selected document for a given container (customerReference) can be seen to include a plurality of fields and values, here shown as Customer Name, Customer Access Number, Customer Type, Customer Status, Customer Date (e.g., when customer first became a customer, or date of customer enrollment), Postal Address {Address Line 1 . . . City, State, Zip, Country}, Accounts {Account Number, Account Type, Product Code, Product Description, Customer Account, Relationship Type, Account Status, Account Open Date, Current Balance}, Person Data {Family Name, First Name . . . }, Delivery Channel, Business Function, Alerts {Alert Number, Description, Level, Expiration Date, Alert Group, Alert Sequence}. It should be understood that attribute changes at non-root level of the document does not necessarily cause any API service code changes or new deployment, and only cause a minimal reference table change.

Returning to FIG. 2, it can be seen that microservices 250 causes the data in a document 360 relevant to each of the queries to be returned to the API service 270. In other words, each of the three queries can receive its designated response in bounded context through the same API service, and the API service is able to dynamically respond to each query type without returning data that was not asked for. This can be contrasted with conventional operations where each query would have required a different predefined API to call the desired data. Instead, for the first query 210, the API service 270 receives and provides a first response targeted to the customer demographics inquiry that includes customerStatus, customerType, personData, and postAddress, and for the second query 220, the same API service 270 receives and provides a second response targeted to the account list inquiry that includes customerDate, customerType, and accounts, and also for the third query 230, the API service 270 receives and provides a third response targeted to the customer alerts inquiry that includes deliveryChannel, businessFunction, and alerts. As will be discussed further below in FIG. 8, the user can able to select or deselect the attributes that should be included in each API call, and if no attributes are selected, the default values can be returned in response to the query.

In different embodiments, each request that comes in is handled by a single API that is able to access the data lake and dynamically pull out the appropriate information based on the query parameters. Once the API receives the query input, it is configured to automatically determine where in the data lake the source of the response is located and fetch it for the user. In different embodiments, the API service is able to locate the appropriate data by its cached metadata which serves as a reference and defines which data is available and where it can be found, as well as limit its retrieval to only the data that is relevant to the specific inquiry. In other words, the cached reference table serves as a directory that the API service uses to navigate to the correct data container and data in a document.

To allow the reader to better appreciate these processes, in the example of FIGS. 2-4, the first query 210 can represent a first use case in which a mobile bank client invokes a customer demographics inquiry. In such a case, the system could follow a sequence: (1) [POS7] https:// . . . /insights/customers/demographics/with client authentication token, access #, and family_name, address_line1; (2) API Proxy looks up client id and calls backend API service based on service endpoint URL API service with client_id "Mobile Banking", and URL "/insights/customers/demographics/"; (3) API intelligent service layer search for matched service by metadata reference table and request payload, and find data to be returned, such as (1200) shown in FIG. 12.

In comparison, the second query 220 can represent a second use case in which a Pega system (or other business process management (8 PM) system or AI low code platform such as Kissflow, Appian, UiPath RPA I Robotic Process Automation, OutSystems, ServiceNow Now Platform, Power Apps, Salesforce Platform, Application Express (APEX), Mendix Platform, ServiceNow Now Platform, Google App Maker (Legacy), etc.) client invokes a customer alerts inquiry. In such a case, the system could follow a sequence: (1) [POS7] https:// . . . /insights/customers/alerts/with client authentication token, access #, and alert_number, description; (2) API Proxy looks up client id and calls backend API service based on service endpoint URL API service with client id "BPM system", and URL "/insights/customers/alerts/"; (3) API intelligent service layer search for matched service by metadata reference table and request payload, and find data to be returned, such as (1300) as shown in FIG. 13.

Figure 5:
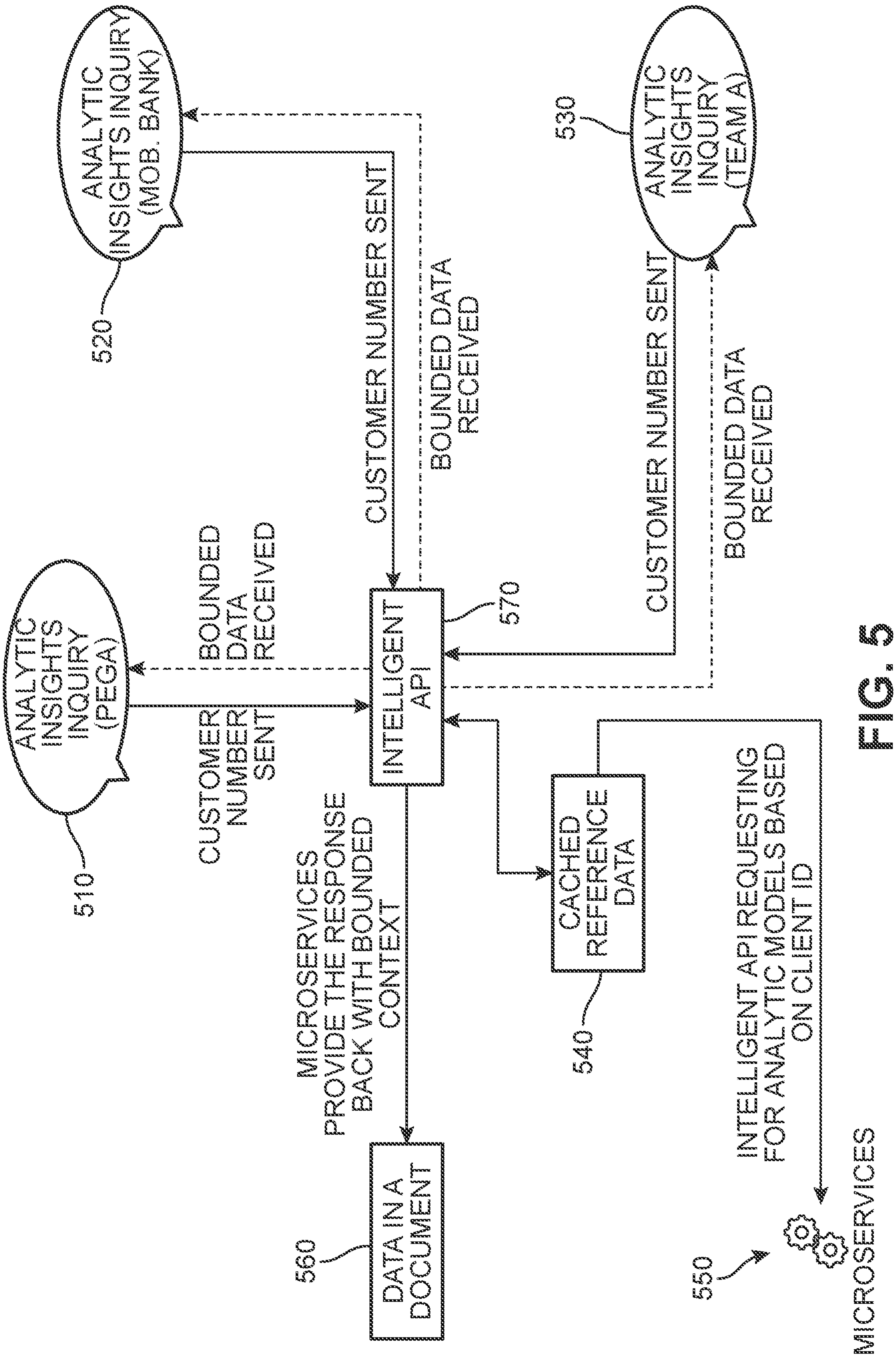
FIGS. 5 and 6 collectively depict a schematic diagram of a set of queries being managed by a fixed API service in the context of a SQL DB, according to an embodiment.
Figure 6:
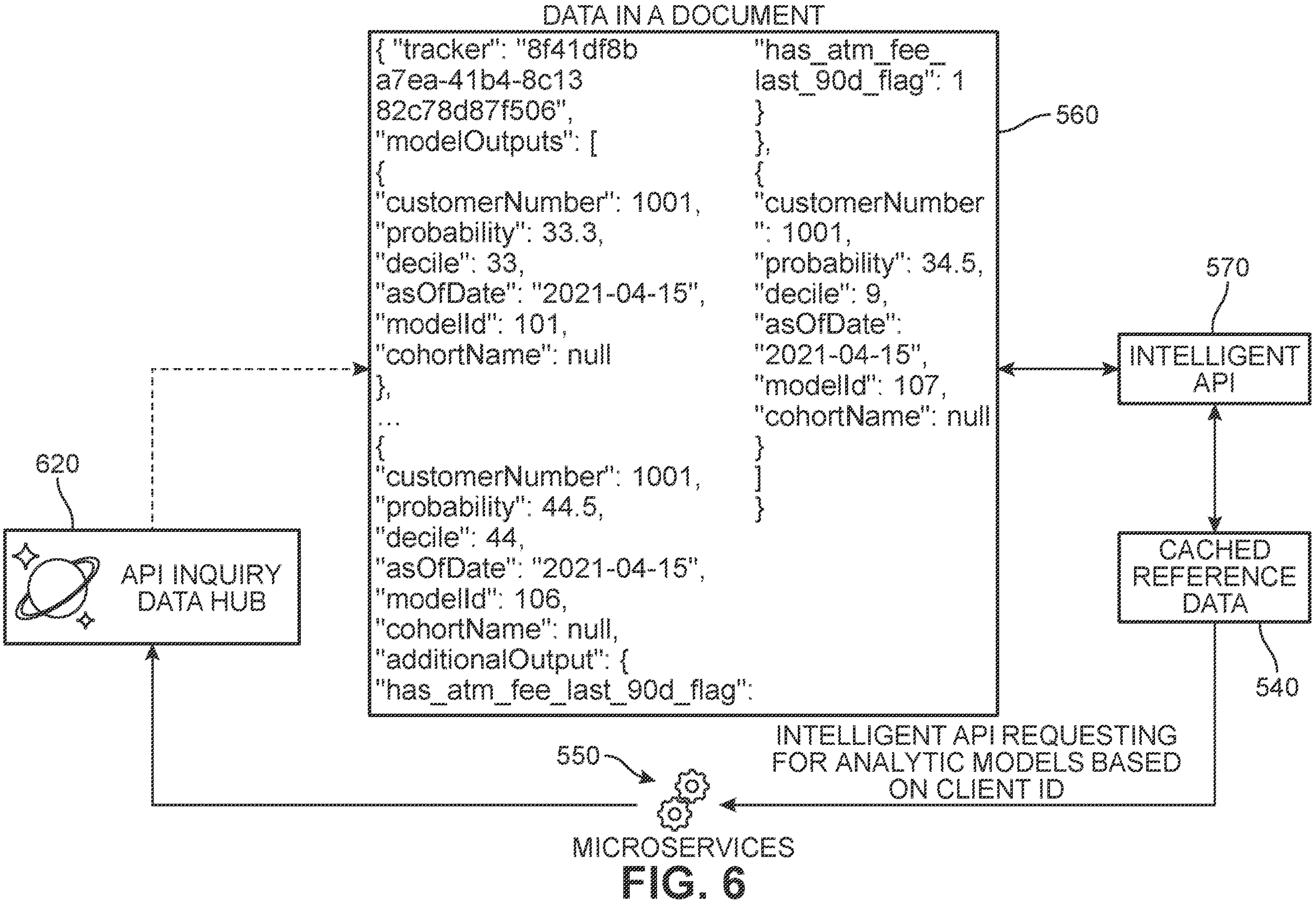

Referring now to FIGS. 5 and 6, for comparison another example of an environment is depicted in which an intelligent API service provider system can be implemented. Although the diagram is shown across two figures for purposes of clarity, it should be understood that they each comprise a portion (sub-environment) of the example environment. In this example, customer analytics insights are provided with SQL DB. In FIG. 5, various example queries are illustrated as they are received by an API service 570. In this case, a first query 510 (e.g., an Analytic Insights inquiry (BPM system)) has been submitted to the API service 570, as well as a second query 520 (e.g., an Analytic Insights inquiry (mobile banking)), and a third query 530 (e.g., an Analytic Insights inquiry (Team A)). In each query, a customer number for the client is transmitted to the API service 570, along with specific parameters if so desired. In response, the API service 570 communicates with cached reference table 540 which generates requests for the data to be retrieved via microservices 550.

In FIG. 6, the process continues as the microservices 550 reaches out to API inquiry datahub 620 to extract the appropriate data in a document 560 based on the selected container. Some example containers that may be maintained in the datahub 620 were shown in FIG. 4, such as customerDemographics, creditCardAccounts, customerRelationshipDetails, depositAccounts, consumerLoans, customerCommunicationPreference, paymentsACH, customerReference, and depositAccountTransactions. Each of the containers can include one or more documents that hold structured data related to that particular container. It is from one of these documents that the microservices 550 can extract information as data in a document 560.

For purposes of this example, the data in a selected document for a given container (customerReference) can be seen to include a plurality of fields and values, here shown as:

{ "tracker": "8f41df8b
a7ea-41b4-8c13
82c78d87f506",
"modelOutputs": [
{
"customerNumber": 1001,
"probability": 33.3,
"decile": 33,
"asOfDate": "2021-04-15",
"modelId": 101,
"cohortName": null
},
...{
"customerNumber": 1001,
"probability": 44.5,
"decile": 44,
"asOfDate": "2021-04-15",
"modelId": 106,
"cohortName": null,
"additionalOutput": {
"has_atm_fee_last_90d_flag":
"has_atm_fee_
last_90d_flag": 1
}
},
{
"customerNumber":
1001,
"probability": 34.5,
"decile": 9,
"asOfDate":
"2021-04-15",
"modelId": 107,
"cohortName": null
}]
}

It should be understood that model output changes within additionalOutput level will not cause any API service code changes or new deployment.

Returning to FIG. 5, it can be seen that microservices 550 causes the data in a document 560 relevant to each of the queries to be returned to the API service 570. In other words, each of the three queries can receive its designated response in bounded context through the same API service, and the API service is able to dynamically respond to each query type without returning data that was not asked for. Thus, for the first query 510, the API service 570 receives and provides a first response targeted to the BPM system-related Analytic Insights inquiry that includes bounded data regarding BPM system, and for the second query 520, the same API service 570 receives and provides a second response targeted to the mobile banking-related Analytic Insights inquiry that includes bounded data regarding mobile banking, and for the third query 530, the API service 570 receives and provides a third response targeted to the Team A-related Analytic Insights inquiry that includes bounded data regarding Team A.

To allow the reader to better appreciate these processes, in the example of FIGS. 5 and 6, the third query 530 can represent a third use case in which a Team A client invokes an Analytic Insights inquiry. In such a case, the system could follow a sequence: (1) [POS7] https:// . . . /insights/customers/ with client authentication token, access #; (2) API Proxy looks up client id and calls backend API service based on service endpoint URL API service with client id "Team A", and URL "/insights/customers/"; (3) API intelligent service layer search for matched service by metadata reference table and request payload, and find data to be returned, such as (1400A) and (1400B) shown in FIGS. 14A and 14B, respectively.

Figure 7:
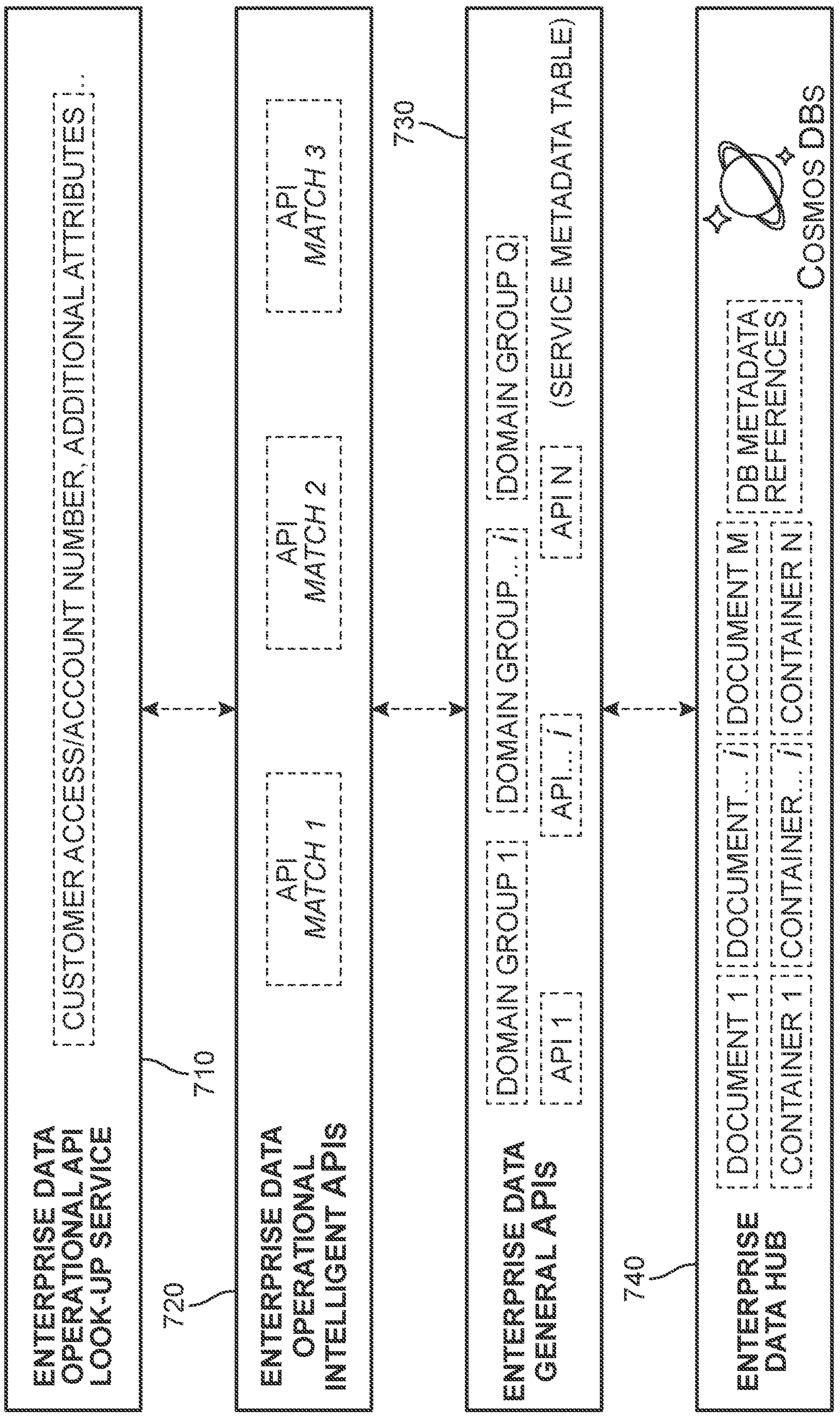
FIG. 7 is a schematic diagram of a process of information flow during the dynamic query-response process, according to an embodiment.

As described above, in different embodiments, the proposed systems can be configured to implement a fixed set of General Intelligent APIs to provide operational API services based on the user's dynamic inputs, with the ability to retrieve defined data for omni-channel usages. A schematic diagram representing an embodiment of the information flow between the different system modules is depicted in FIG. 7. For the example of FIG. 7, an enterprise data operational API look-up service 710 can be used as a client (e.g., a customer service representative) looks for customer/account information with additional attribute 1, . . . , p of the customer, and look up matched general services in enterprise data operational intelligent APIs 720 by data and service metadata reference tables (e.g., see cached metadata reference table 154 in FIG. 1). In one example, the API services are ranked based on their match as 1, 2, and 3. The operational intelligent APIs can provide intelligent API service to retrieve required information that combine the functions of an API Service call 1, API Service call 2, and API Service call 3. In some optional embodiments, the user can confirm the identified API services and attributes to retrieve related information. Furthermore, in some embodiments, enterprise data general APIs 730 can be accessed (including domain groups, APIs, and a service metadata table). The data is retrieved from Enterprise datahub 740 that can include a plurality of containers (container 1, container . . . 1, container N) and documents (document 1, document . . . i, document N), as well as metadata references. As a general matter, for each enterprise domain, the number of APIs will be fixed based on the number of containers that are provided and/or storing data for that enterprise. As one non-limiting example, for a first enterprise with five data containers, there may be ten fixed APIs. If the same first enterprise adds a data container to its cloud storage such that it now has six data containers, the number of fixed APIs may be increased to twelve APIs.

Figure 8:
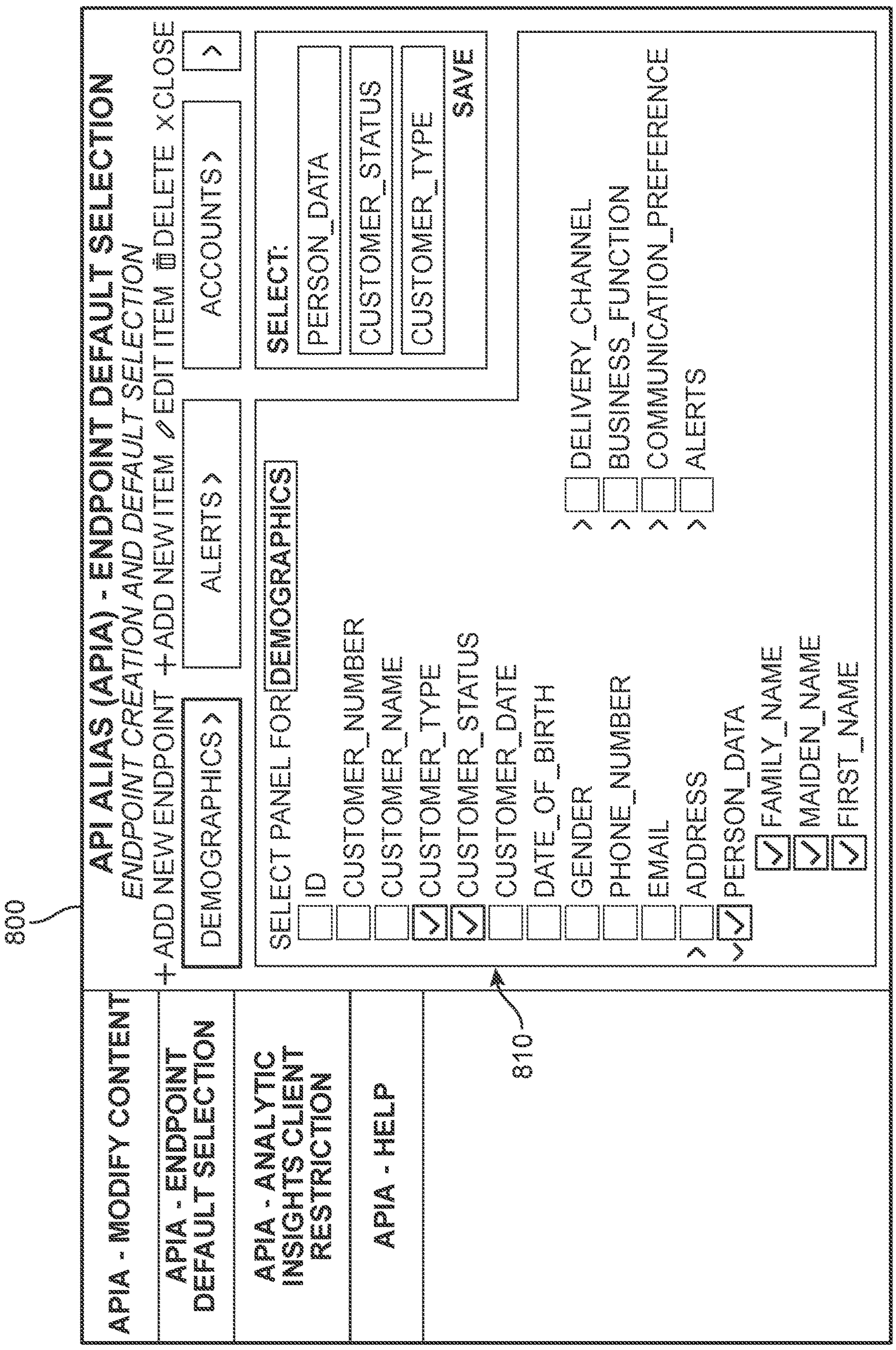
FIG. 8 is an example of a user interface for redefining one or more end-points associated with a data parameter, according to an embodiment.

An example of a user interface 800 for administrator configuration of the metadata reference table (MRT) for a general intelligent API is depicted in FIG. 8. The user interface 800 in some embodiments can be understood to represent a façade or alias for the API, and includes a plurality of selectable endpoint options 810 by which a user can define what data should be returned in response to specific query types. Thus, even during runtime, an administrator-level user is able to modify the behavior of the intelligent API by removing or adding attributes that are to be returned. It should be appreciated that the selection of any of these endpoint options 810 affects the API's behavior, but does not affect the code for the API. In some embodiments, there can be customization by the system administrator without requiring any change to the API code itself. Thus, system administrator can custom-select and define what functions and how the API performs. In other words, rather than require the client to reach back to the software programmers or vendors, they are now able to make the desired changes themselves directly, whenever and however they wish. This empowers each administrator to dynamically define what the API will do and how it will respond to each query type. In this example, the API returns default information selected by the administrator, as well as the ones defined in request payload including "family_name", "maiden_name", and "first_name" and parent object "person_data", as well as "customer type" and "customer_status".

In some embodiments, the user interface 800 or other components of the proposed systems may require a specific data attribute which has not yet been populated in the data lake or ADH. In such cases, as long as the specific data has been made available or is otherwise stored in the data lake or ADH container, embodiments of the Intelligent API system described herein can be configured to locate and deliver the selected data attribute to the requesting system by implementing a cache refresh mechanism which will update the reference table data to include the new data attribute(s). A user will then be able to access these data attributes as long as the user has and presents the appropriate permissions for such data. This process enhances the performance of the API by allowing the most current file and attribute information in the cache to be refreshed and available, without requiring changes to the underlying code for the API. As a specific example, referring back to FIG. 3, an administrator may add the data attribute of "County" to the Address attributes stored in the data container. Once this update has been made, subsequent requests by authorized end-users for a data value related to the new County attribute specifically or more generally to the Address attributes to the API can return the County value—without any further changes being made to the API code as it was originally implemented ("fixed" API).

In other examples, the API could instead (depending on the administrator's selections of each filtering option via the user interface 800) return default information selected by the administrator, in addition to any information defined (selected) in the request payload, including various dynamic attributes, such as "date_of_birth", "level" and its parent object "alerts". In still another example, the API might return default information selected by the administrator, in addition to any information defined (selected) in the request payload, including various dynamic attributes, dynamic attributes, such as "gender", "family_name" and its parent object "person_data".

The user interface 800 is configured to permit administrators to define what the response should look like (e.g., what endpoint values should be included in response to a specific parameter in a query), and the API can then provide the user with the response that exactly corresponds to that definition. Once the selections are made and saved, a new or revised contract is formed. Similarly, selections can be un-made (de-selected) to cause the API to no longer return responses that include that particular endpoint value.

In addition, these modifications can be dynamically made while observing the API behavior during runtime. As an example, in FIG. 8, the API service can return default information selected by the Administrator, plus the ones defined in request payload as dynamic attributes, "gender", "family_name" and its parent object "person_data".

Furthermore, in different embodiments, the API service can be configured to only return the information that is permissible for the user to access, with a memory cache that can control which client can access which part of the data without compromised data privacy or security. In other words, if a teller at a bank pulls up a customer's account information and requests their Social Security Number (SSN), the API service would take into consideration the teller's access level and permissions and prevent the return of that information based on its determination that this person is not allowed to access that kind of information.

In different embodiments, the client can be given multiple AI machine learning data and multiple models, each for the same API service, where each model can be based on the access permissions that have been established for that enterprise and the kind of data that is allowed for each access level. In addition, the system can be configured to intelligently extrapolate the terms of a query to determine what a response might include under a specific data container in the datahub by including all information semantically related to the query. The response can return data based not just on the parent tree but any relevant information stored in the substructure of that parent (e.g., an inquiry for postal code can also return the same response for zip code based on the understanding that these refer to the same content).

Figure 9:
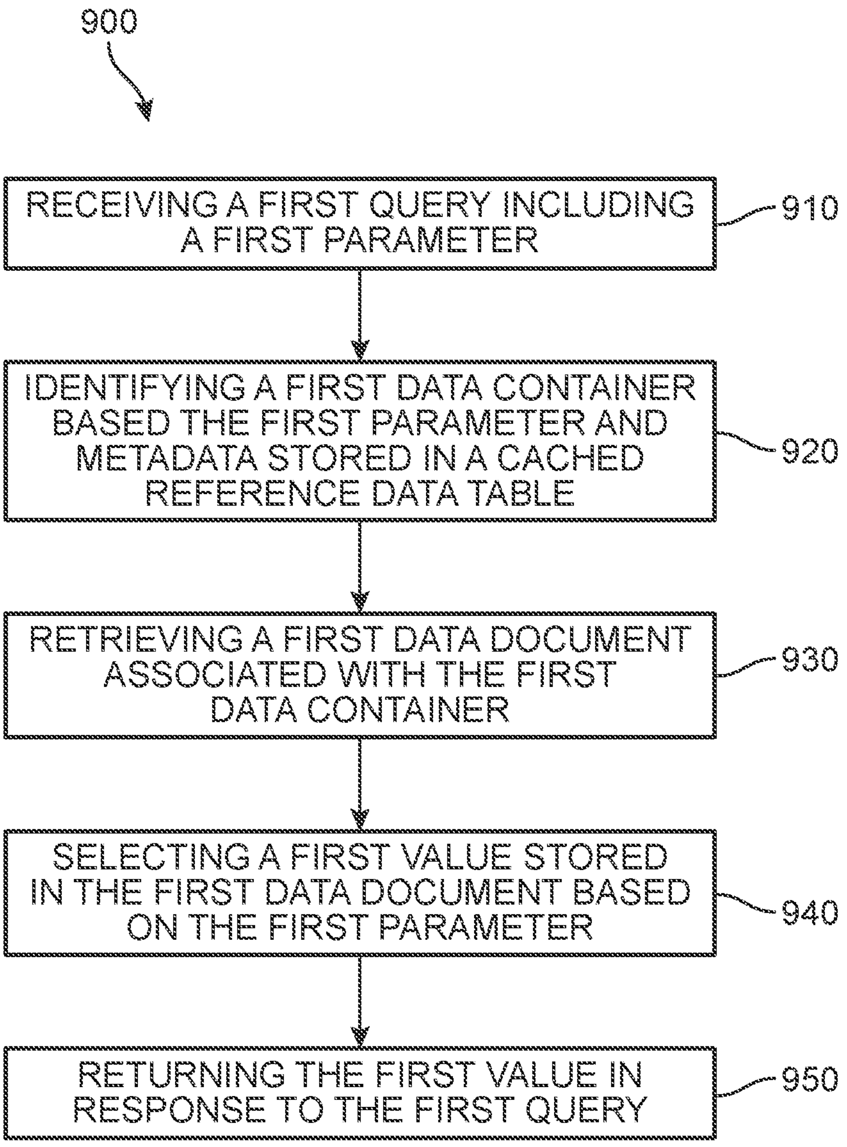
FIG. 9 is a flow chart depicting a method for returning responses to dynamic queries using a fixed set of application programming interfaces (APIs), according to an embodiment.

FIG. 9 is a flow chart illustrating an embodiment of a method 900 of returning responses to dynamic queries using a fixed set of application programming interfaces (APIs). As shown in FIG. 9, a first step 910 of the method 900 includes receiving, at an API, a first query including a first parameter from a first client computing device, and a second step 920 includes identifying, by the API, a first data container of a plurality of data containers stored in a cloud-hosted datahub, the identification based on the first parameter and metadata stored in a cached reference table. A third step 930 includes retrieving, by a first microservice associated with the API and from the datahub, a first data document associated with the first data container, and a fourth step 940 includes selecting, by the first microservice, a first value for an endpoint stored in the first data document based on the first parameter. For example, the first value is retrieved by way of a cached request-response metadata reference table or dictionary. In addition, a fifth step 950 includes returning, by the API, the first value for presentation at a first time via the first client computing device in response to the first query.

In other embodiments, the method may include additional steps or aspects. In one example, the method also includes a step of mapping and transforming enterprise data into a cached reference table. In another example, where the first query includes a first access identifier and the method further can also include steps of receiving, at an authorization module, the first access identifier, and determining, at the authorization module, whether a user associated with the first access identifier is authorized to access values for the first parameter, where the first value is returned only if the authorization module determines the first access identifier is authorized to access values for the first parameter.

In some embodiments, the method also includes steps of receiving, at the API, a second query including a second parameter from a second client computing device, the second query differing from the first query, identifying, by the API, a second data container of the plurality of data containers, the identification based on the second parameter and metadata stored in a cached reference table, retrieving, by a second microservice associated with the API and from the datahub, a second data document associated with the second data container, selecting, by the second microservice, a second value stored in the second data document based on the second parameter, and returning, by the API, the second value for presentation via the second client computing device.

In another example, the method can further include steps of presenting, at the first client computing device, a user interface for modifying parameters defined by the cached reference table, receiving, from the first client computing device, a selection of an additional endpoint associated with the first parameter, and redefining at a second time an operation of the API in response to the selection. In some examples, the method also includes steps of receiving, at the API, a second query including the first parameter from the first client computing device, the second query and first query being substantially similar, selecting, by the first microservice, a second value based on the additional endpoint stored in the first data document, and returning, by the API, both the first value and the second value for presentation at a third time via the first client computing device in response to the second query. In some embodiments, the cached reference table provides location information that allows the first microservice to locate and retrieve the first data document. In another embodiment, the datahub is maintained as a data lake in which structured, canonical enterprise resource data is stored.

Figure 10:
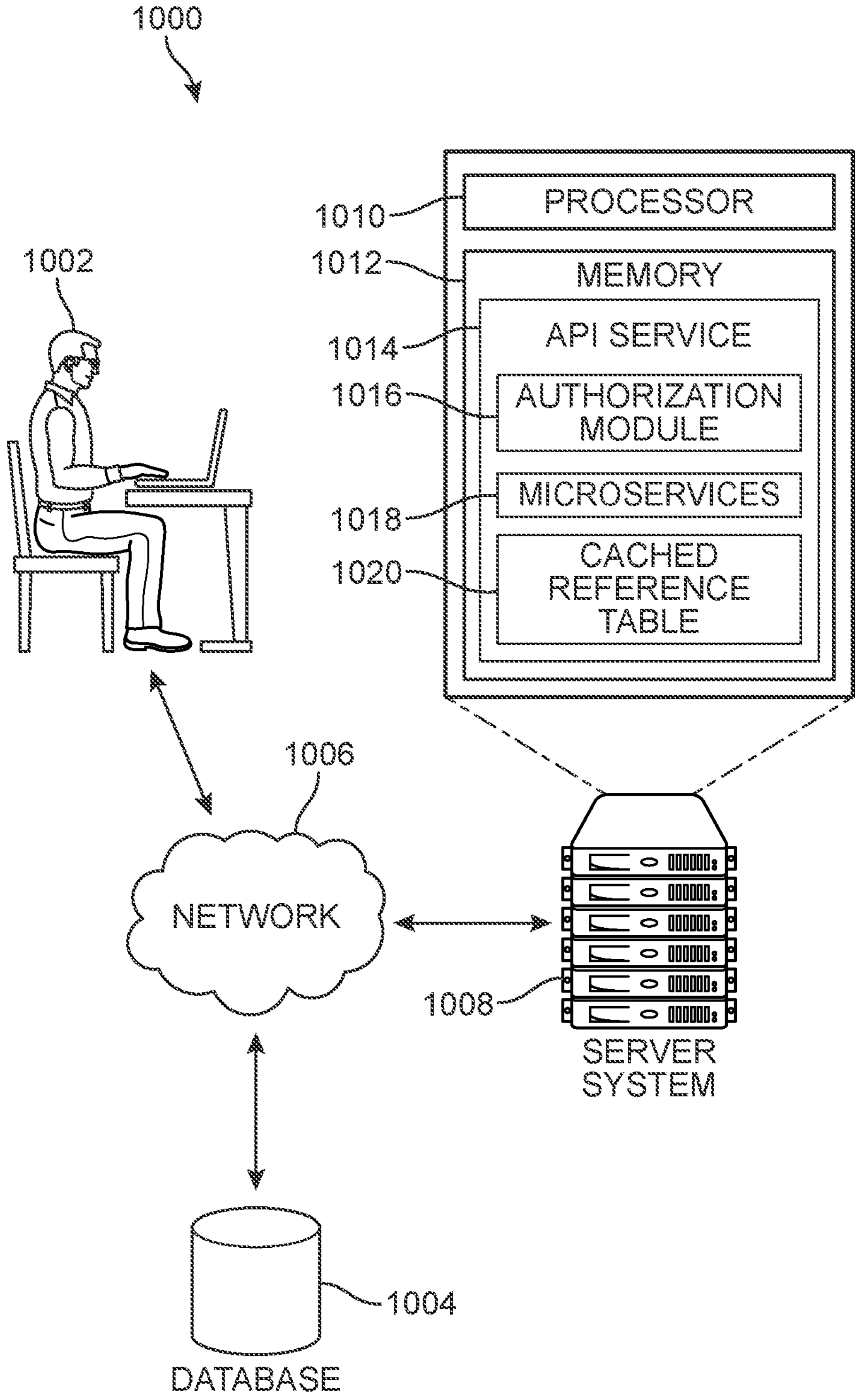
FIG. 10 is a diagram depicting example environments and components by which systems and/or methods, described herein, may be implemented.

FIG. 10 is a schematic diagram of an environment 1000 for a security requirements identification system (or system 1000), according to an embodiment. The environment 1000 may include a plurality of components capable of performing the disclosed methods. For example, environment 1000 includes a user device 1002, a computing/server system 1008, and a database 1004. The components of environment 1000 can communicate with each other through a network 1006. For example, user device 1002 may retrieve information from database 1004 via network 1006. In some embodiments, network 1006 may be a wide area network ("WAN"), e.g., the Internet. In other embodiments, network 1006 may be a local area network ("LAN").

As shown in FIG. 10, components of an API service system ("API service") 1014 may be hosted in computing system 1008, which may have a memory 1012 and a processor 1010. Processor 1010 may include a single device processor located on a single device, or it may include multiple device processors located on one or more physical devices. Memory 1012 may include any type of storage, which may be physically located on one physical device, or on multiple physical devices. In some cases, computing system 1008 may comprise one or more servers that are used to host the system.

While FIG. 10 shows one user device, it is understood that one or more user devices may be used. For example, in some embodiments, the system may include two or three user devices. In some embodiments, the user device may be a computing device used by a user. For example, user device 1002 may include a smartphone or a tablet computer. In other examples, user device 1002 may include a laptop computer, a desktop computer, and/or another type of computing device. The user devices may be used for inputting, processing, and displaying information. Referring to FIG. 10, environment 1000 may further include database 1004, which stores enterprise data such as the API inquiry datahub as well as other external components. This data may be retrieved by other components for API service 1014. As discussed above, API service 1014 may include an authorization module 1016, microservices 1018, and one or more cached reference tables 1020. Each of these components may be used to perform the operations described herein.

As described herein, a fixed set of general APIs can be used to provide "Data as a Service" to the Enterprise by employing a "API as a Product" approach. In some embodiments, the fixed set of general APIs allow all users/channels to query any information available from the API Inquiry Data Hub (ADH). The ADH is maintained as a data lake with robustly organized structure of data (e.g., canonical information data model). The proposed systems can support different backend data sources, including SQL and NoSQL. Furthermore, the system is highly scalable and can be configured to support high volume calls (e.g., >500K calls daily) in the Cloud. Deployment for new channel partners and applications requires minimal API service code changes, and these are directed to only service configuration changes. Furthermore, the system offers an additional level of data privacy control and protections against unauthorized client application access.

To provide further context, in some embodiments, some of the processes described herein can be understood to operate in a system architecture that can include a plurality of virtual local area network (VLAN) workstations at different locations that communicate with a main data center with dedicated virtual servers such as a web server for user interfaces, an app server for OCR and data processing, a database for data storage, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

In different embodiments, applications of the system are built and deployed by a software framework. A software framework is a universal, reusable software environment that provides particular functionality as part of a larger software platform to facilitate development of software applications. Software frameworks may include support programs, compilers, code libraries, tool sets, and application programming interfaces (APIs) that enable development of a software application. Some implementations can provide a user device and/or component management platform that is capable of facilitating the development of software applications through the use of a user interface designed to be simple to use, and re-usable software components (e.g., buttons, links, fields, graphics, and/or the like) that can be displayed in the user interface and generated in multiple different software frameworks and/or programming languages for a variety of platforms. For example, the component management platform may provide a first software application that includes a user interface through which a user can develop a second software application. The user may use features of the user interface to create software components that are displayed in the first software application (e.g., the UI) using a first programming language (e.g., hypertext markup language (HTML) or another programming language associated with the first software application) and generated in a first software framework (e.g., a software framework associated with the software application being developed). The user interface may include features, such as drag and drop operations for the creation of software components and selectable software component characteristics, to facilitate creation and customization of software components. In some implementations, the component management platform may store components that were previously generated by users, generate copies of software components in multiple software frameworks and/or for different platforms, and make software components available for users to include in software applications that are under development.

In this way, a user device and/or cloud server may facilitate the development of software applications in multiple software frameworks and for multiple platforms, without requiring special knowledge or repeated component development on the part of a user, and in a manner designed to be relatively quick and efficient. Special software framework knowledge and/or familiarity may not be required, for example, by using a user interface to enable the generation of software components in multiple software frameworks in a single integrated development environment, such as a web-based integrated development environment that is accessible from any device with a web browsing application browser. Some non-limiting examples of such frameworks include Microsoft.NET™, the EMC™ integrated development environment, the Microsoft™ Visual Studios integrated development environment for writing and debugging code, and the Eclipse™ integrated development environment for incorporation of open source code. Reusable software components may significantly increase the speed and efficiency of software development, including facilitating more efficient use of software developer time and computing resources (e.g., processor resources, memory resources, and/or the like). Some implementations may reduce network communications relative to a purely cloud-based application development solution, e.g., by enabling the user device to perform much of the functionality for component and software application development without the need to interact with a server computer over a network, which would introduce latency into the development process. Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create multiple software components in multiple software frameworks.

In some embodiments, the software development application may be an application installed on and executed by the user device. In some implementations, the software development application may be a web-based application designed to execute a web application (e.g., an application operating on a server computer or the component management platform, and implemented in HTML, JavaScript, and/or the like). The software development application may be written in a variety of programming languages and provide a variety of different types of user interface elements, which may be used in the development of a new software component and/or another software application. In some embodiments, the software development application includes a component toolbox. The component toolbox may be presented via a user interface offering one or more interactable user interface elements, such as buttons, which are associated with software components. For example, the component toolbox may include one or more buttons for the generation of software components, such as input components (e.g., buttons, checkboxes, dropdown lists, toggle buttons, text fields, and/or the like), navigational components (e.g., search fields, sliders, pagination indicators, links, icons, and/or the like), informational components (e.g., tooltips, progress bars, message boxes, images, and/or the like), and/or the like. In some implementations, the component toolbox may include user interface elements that generate a software component based on a pre-existing software component (e.g., a previously created software component). In some implementations, the component toolbox may include a user interface element designed to enable the creation of a new software component, which may enable a user of the user device to define a new type of software component.

For purposes of this disclosure, the Application Programming Interfaces (APIs) may refer to computer code that supports application access to operating system functionality. A platform dependent API may be understood to rely on the functionality of a particular software platform. The platform dependent API may use device specific libraries or native code allowing access to the mobile device at a low level. The API can be configured to provide a wide range of visualization dashboards for document processing management, as will be discussed below.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage device, an input component, an output component, and a communication interface.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage devices, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape.

Embodiments may also include one or more computers and one or more storage devices storing instructions that are operable, when executed by the one or more computers, to cause the one or more computers to perform the disclosed methods.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Software instructions may be read into memory and/or storage devices from another computer-readable medium or from another device via communication interface. When executed, software instructions stored in memory and/or storage device may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via a cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a user interface, or other such information presentation.

In addition to the algorithms and techniques described above, one or more of the following techniques may be utilized by one or more of the disclosed embodiments: RPA, Mongo DB, Artificial Intelligence (AI) Modules such as Python, Image to Text, OCR, Computer Vision, Image comparison (phase comparison), Image Validation (image to text, then text to text comparison), Learning Algorithms, Similarity Analytics, Sequencing algorithms, Random Forest, graph Convolutional Neural Networks (gCNN), Data Clustering with weighted data, Data Visualization, Rocket Chat, and D3JS.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources can generally be managed by a server and data storage system maintained by a platform provider, as opposed to computers within the actual client (tenant) businesses themselves. In addition, a Cloud Service Provider (CSP) may include an organization that provides a cloud computing resource to a client device and/or a user of a client device. Furthermore, the term "component" refers to software applications and other system modules and features comprising or supporting the multi-tenant architecture.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for returning responses to dynamic queries using a fixed set of application programming interfaces (APIs), the method comprising:

receiving, at an API, a first query including a first parameter from a first client computing device;

identifying, by the API, a first data container of a plurality of data containers stored in a cloud-hosted datahub, the identification based on the first parameter and metadata stored in a cached reference table, wherein the datahub is maintained as a data lake in which structured, canonical enterprise resource data is stored;

determining, by the API, location of data in the data lake, relevant to the first query, wherein the data is associated with a first data document;

retrieving, by a first microservice associated with the API and from the datahub, the first data document associated with the first data container;

selecting, by the first microservice, a first value stored in the first data document based on the first parameter;

returning, by the API, the first value for presentation at a first time via the first client computing device in response to the first query;

presenting, at the first client computing device, a user interface for modifying parameters defined by the cached reference table;

receiving, from the first client computing device, a selection of an additional endpoint associated with the first parameter;

redefining at a second time an operation of the API in response to the selection;

receiving, at the API, a second query including the first parameter from the first client computing device, the second query and the first query being similar;

selecting, by the first microservice, a second value based on the additional endpoint stored in the first data document; and returning, by the API, both the first value and the second value for presentation at a third time via the first client computing device in response to the second query.

2. The method of claim 1, wherein the first query includes a first access identifier and the method further comprises:

receiving, at an authorization module, the first access identifier; and determining, at the authorization module, whether a user associated with the first access identifier is authorized to access values for the first parameter, wherein the first value is returned only if the authorization module determines the first access identifier is authorized to access values for the first parameter.

3. The method of claim 1, further comprising:

receiving, at the API, another query including another parameter from a second client computing device, the other query differing from the first query;

identifying, by the API, a second data container of the plurality of data containers, the identification based on the second parameter and metadata stored in a cached reference table;

retrieving, by a second microservice associated with the API and from the datahub, a second data document associated with the second data container;

selecting, by the second microservice, a second value stored in the second data document based on the second parameter; and returning, by the API, the second value for presentation via the second client computing device.

4. The method of claim 1, wherein the cached reference table provides location information that allows the first microservice to locate and retrieve the first data document.

5. A non-transitory computer-readable medium storing software comprising instructions executable by one or more computers which, upon such execution, cause the one or more computers to:

receive, at an API, a first query including a first parameter from a first client computing device;

identify, by the API, a first data container of a plurality of data containers stored in a cloud-hosted datahub, the identification based on the first parameter and metadata stored in a cached reference table, wherein the datahub is maintained as a data lake in which structured, canonical enterprise resource data is stored;
- determine, by the API, location of data in the data lake, relevant to the first query, wherein the data is associated with a first data document;
- retrieve, by a first microservice associated with the API and from the datahub, the first data document associated with the first data container;
- select, by the first microservice, a first value stored in the first data document based on the first parameter;
- return, by the API, the first value for presentation at a first time via the first client computing device in response to the first query;
- present, at the first client computing device, a user interface for modifying parameters defined by the cached reference table;
- receive, from the first client computing device, a selection of an additional endpoint associated with the first parameter;
- redefine at a second time an operation of the API in response to the selection;
- receive, at the API, a second query including the first parameter from the first client computing device, the second query and the first query being similar;
- select, by the first microservice, a second value based on the additional endpoint stored in the first data document; and
- return, by the API, both the first value and the second value for presentation at a third time via the first client computing device in response to the second query.

6. The non-transitory computer-readable medium storing software of claim 5, wherein the first query includes a first access identifier and the instructions further cause the one or more computers to:
- receive, at an authorization module, the first access identifier; and
- determine, at the authorization module, whether a user associated with the first access identifier is authorized to access values for the first parameter, wherein the first value is returned only if the authorization module determines the first access identifier is authorized to access values for the first parameter.

7. The non-transitory computer-readable medium storing software of claim 5, wherein the instructions further cause the one or more computers to:
- receive, at the API, another query including another parameter from a second client computing device, the other query differing from the first query;
- identify, by the API, a second data container of the plurality of data containers, the identification based on the second parameter and metadata stored in a cached reference table;
- retrieve, by a second microservice associated with the API and from the datahub, a second data document associated with the second data container;
- select, by the second microservice, a second value stored in the second data document based on the second parameter; and
- return, by the API, the second value for presentation via the second client computing device.

8. The non-transitory computer-readable medium storing software of claim 5, wherein the cached reference table provides location information that allows the first microservice to locate and retrieve the first data document.

9. A system for returning responses to dynamic queries using a fixed set of application programming interfaces (APIs), the system comprising one or more computers and one or more storage devices storing instructions that are operable, when executed by the one or more computers, to cause the one or more computers to:
- receive, at an API, a first query including a first parameter from a first client computing device;
- identify, by the API, a first data container of a plurality of data containers stored in a cloud-hosted datahub, the identification based on the first parameter and metadata stored in a cached reference table, wherein the datahub is maintained as a data lake in which structured, canonical enterprise resource data is stored;
- determine, by the API, location of data in the data lake, relevant to the first query, wherein the data is associated with a first data document;
- retrieve, by a first microservice associated with the API and from the datahub, the first data document associated with the first data container;
- select, by the first microservice, a first value stored in the first data document based on the first parameter;
- return, by the API, the first value for presentation at a first time via the first client computing device in response to the first query;
- present, at the first client computing device, a user interface for modifying parameters defined by the cached reference table;
- receive, from the first client computing device, a selection of an additional endpoint associated with the first parameter;
- redefine at a second time an operation of the API in response to the selection;
- receive, at the API, a second query including the first parameter from the first client computing device, the second query and the first query being similar;
- select, by the first microservice, a second value based on the additional endpoint stored in the first data document; and
- return, by the API, both the first value and the second value for presentation at a third time via the first client computing device in response to the second query.

10. The system of claim 9, wherein the first query includes a first access identifier and the instructions further cause the one or more computers to:
- receive, at an authorization module, the first access identifier; and
- determine, at the authorization module, whether a user associated with the first access identifier is authorized to access values for the first parameter, wherein the first value is returned only if the authorization module determines the first access identifier is authorized to access values for the first parameter.

11. The system of claim 9, wherein the instructions further cause the one or more computers to:
- receive, at the API, another query including another parameter from a second client computing device, the other query differing from the first query;
- identify, by the API, a second data container of the plurality of data containers, the identification based on the second parameter and metadata stored in a cached reference table;
- retrieve, by a second microservice associated with the API and from the datahub, a second data document associated with the second data container;
- select, by the second microservice, a second value stored in the second data document based on the second parameter; and
- return, by the API, the second value for presentation via the second client computing device.

12. The system of claim 9, wherein the cached reference table provides location information that allows the first microservice to locate and retrieve the first data document.

* * * * *